Aug. 23, 1932.     L. F. HOLLAND     1,873,407

ICE CREAM FREEZER

Filed June 25, 1931     2 Sheets-Sheet 1

Inventor

Lyman F. Holland

By Clarence A. O'Brien

Attorney

Aug. 23, 1932. L. F. HOLLAND 1,873,407
ICE CREAM FREEZER
Filed June 25, 1931  2 Sheets-Sheet 2

Inventor
Lyman F. Holland

By Clarence A. O'Brien
Attorney

Patented Aug. 23, 1932

1,873,407

UNITED STATES PATENT OFFICE

LYMAN F. HOLLAND, OF MOBILE, ALABAMA

ICE CREAM FREEZER

Application filed June 25, 1931. Serial No. 546,842.

This invention relates to certain new and useful improvements in ice cream freezers, and has for its primary object the freezing of ice cream or the like within an ice box, electric refrigerator and similar devices.

A still further object of the invention is to overcome the objections to the present method of freezing edibles in electric refrigerators.

Other objects and advantages of the invention will become apparent from a study of the following description, taken in connection with the accompanying drawings wherein.

Figures 3, 4:
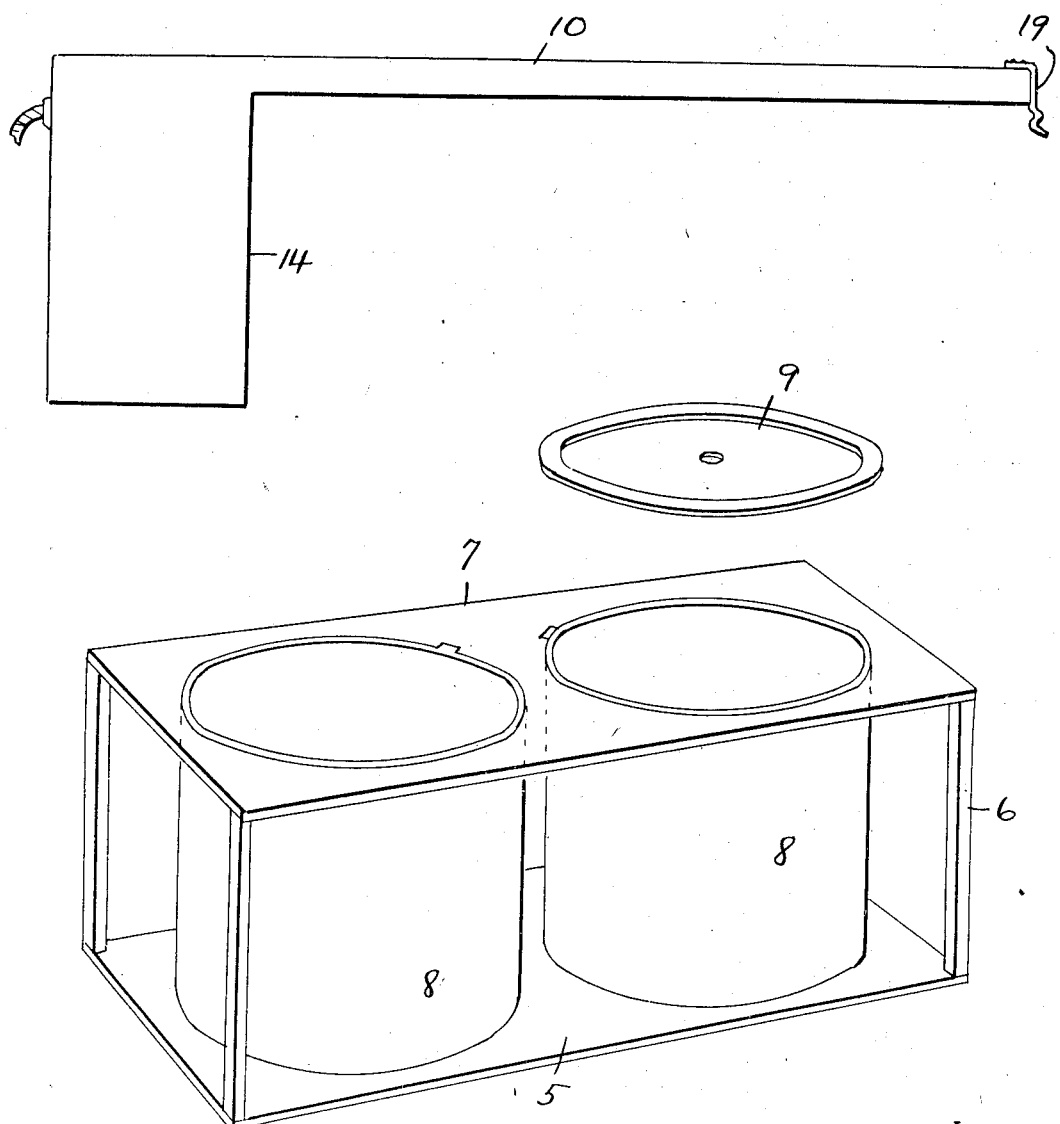
Figure 3 is an elevational view of the combined gear casing and motor housing.
Figure 4 is a perspective view of a receptacle support, the lid of one of the receptacle supports being shown separate from the receptacle.

With reference more in detail to the drawings, and particular attention being directed to Figure 4, it will be seen that I have provided a receptacle support, which consists of a base plate 5 having corner posts 6 rising therefrom and supporting an apertured top plate 7. The support is, in the present instance constructed to accommodate two receptacles 8 for the material to be frozen. The device is primarily adapted for freezing ice cream. Each receptacle 8 will be of suitable capacity, and is preferably cylindrical being open at its top. The apertures in the top plate 7 accommodates the upper portions of the receptacles 8 which latter rest on the bottom plate 5. Each of the receptacles 8 is provided with a suitable cover 9 which fits down into the upper portion of the receptacle.

A combined gear casing and motor housing comprises a relatively elongated substantially rectangular shell like casing part 10 within which are suitably journalled two relatively large sprocket wheels 11 and a smaller sprocket wheel 12. The sprocket wheels are connected by a suitable drive chain 13 trained thereover.

At one end thereof, the shell like part 10 is integral with the upper end of a casing section 14 within which is suitably located an electric motor 15 on the armature shaft 16 of which is suitably keyed the sprocket 12.

Figure 1:
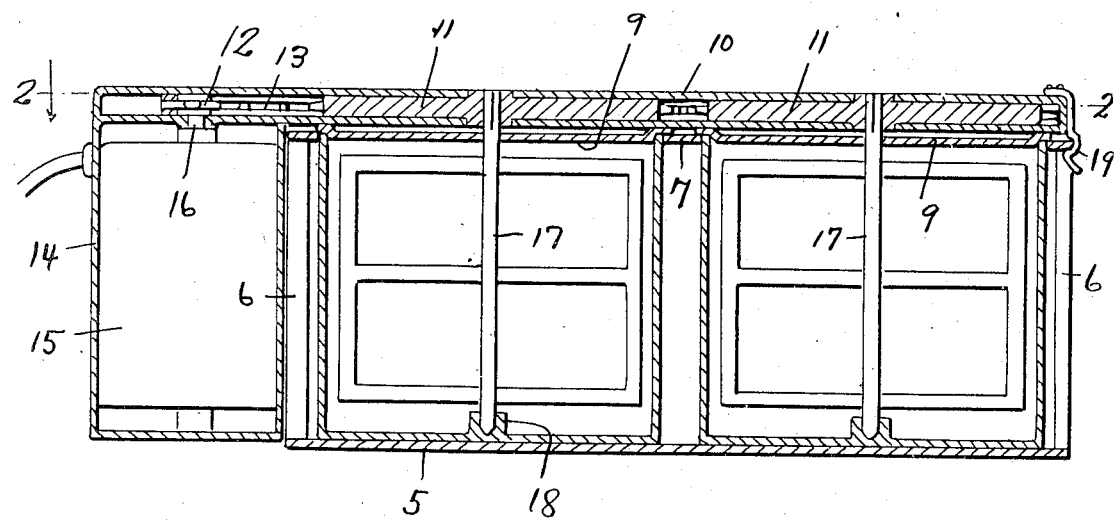
Figure 1 is a longitudinal sectional elevational view through the freezer.
Figure 2:
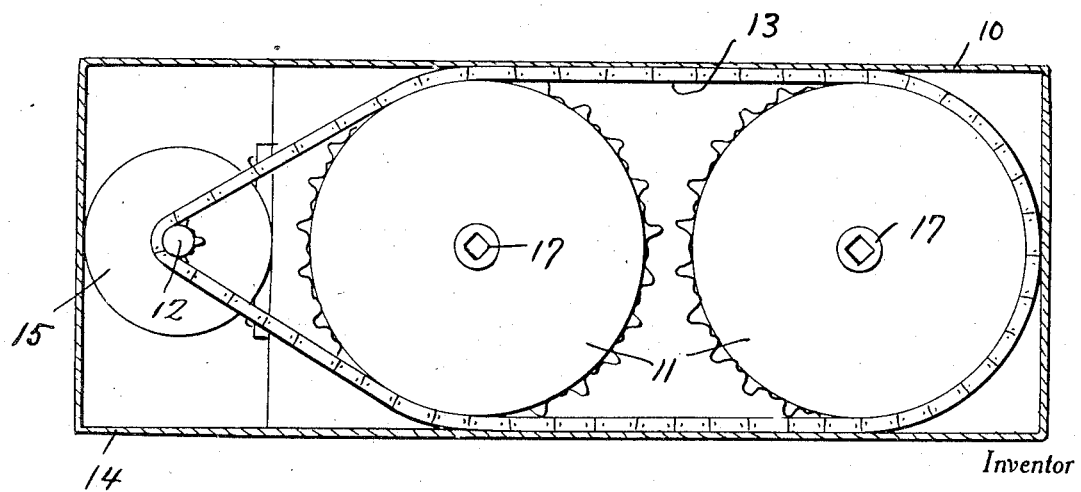
Figure 2 is a longitudinal sectional view through a combined gear casing and motor housing.

Each of the sprocket wheels 11 is keyed to the upper end of a "dasher" or rotary agitator 17, which dasher or agitator includes a shaft, having wings or agitating elements projecting radially therefrom. (See Figure 1).

In actual practice, the receptacles 8 have the material to be frozen placed therein, after which the covers are placed in position on the receptacles, the covers 9 being suitably apertured for accommodating the shafts of the agitators 17 so that the placing of the covers 9 in position is accomplished at the same time the dashers or agitators 17 are inserted into the receptacles 8.

When the agitators are placed within the receptacles, it will be seen that the casing section 10 will rest on the top plate 7 of the support, with the casing part 14 located at one end of the support.

With the parts assembled as just described, it will be seen that the lower end of the agitator shafts will be received in suitable bearings 18 provided in the bottoms of the receptacles 8, and the spring clip 19 provided on that end of the sprocket or gear housing 10 remote from the motor housing 14 will engage an adjacent edge of the top plate 7 of the receptacle support.

With the parts now assembled, the entire assembly as a unit may be placed in a refrigerator of the electric, or any type, and through the medium of suitable switch means not shown motor 15 is set in operation, and power from the motor is transmitted, through the chain and sprocket means described in detail to the agitators or dashers for rotating the same as and for the purpose thought apparent.

The advantages of a freezer embodying the features above set forth, are thought to be readily apparent. Aside from the fact that the freezer would require no attention after once being set in operation, it will enable the user to actually make ice cream in a refrigerator and avoid the solidly frozen food which the present freezing trays now produce. By means of the dashers or agitators constantly stirring the liquid as it freezes, a smooth creamy food will be the result, whereas the present method of freezing in refrigerators produces a block of solid crystals which resembles ice more than they do ice cream.

Even though I have herein shown and described the preferred embodiment of the invention, it is to be understood that the same is susceptible of further changes, modifications and improvements coming within the scope of the appended claims.

Having thus described my invention, what I claim as new is:

1. A freezer comprising in combination a support adapted to receive and contain in relatively fixed position a plurality of receptacles, a casing disposed adjacent one end of the support, said casing having adjacent the upper end thereof a lateral extension resting on the top of the support and substantially closing the top of said receptacles, sprockets arranged in said casing extension, an agitator for disposition in each of said receptacles, each of said agitators including a shaft keyed to one of said sprockets, a motor in said casing and including a shaft equipped with a sprocket, and a drive chain trained over all of said sprockets.

2. A device of the character described comprising in combination a support including an apertured top plate, a plurality of receptacles arranged on said support and having the upper end portions thereof extending into the apertures of said top plate, a casing adapted to rest on said top plate, a pair of agitator shafts extending from said casing for disposition into said receptacle, agitators on said shafts, and means for driving said shafts.

In testimony whereof I affix my signature.

LYMAN F. HOLLAND.